US012552265B2

(12) United States Patent
Kwon (10) Patent No.: US 12,552,265 B2
(45) Date of Patent: Feb. 17, 2026

(54) METHOD OF CONTROLLING DRIVING OF A PLURALITY OF MOBILITY DEVICES CONNECTED BY A PIVOT MECHANISM

(71) Applicants: HYUNDAI MOTOR COMPANY, Seoul (KR); KIA CORPORATION, Seoul (KR)

(72) Inventor: Gi Young Kwon, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 177 days.

(21) Appl. No.: 18/527,035

(22) Filed: Dec. 1, 2023

(65) Prior Publication Data

US 2025/0050746 A1 Feb. 13, 2025

(30) Foreign Application Priority Data

Aug. 7, 2023 (KR) .................. 10-2023-0102734

(51) Int. Cl.
*B60L 15/20* (2006.01)
*B62D 13/06* (2006.01)

(52) U.S. Cl.
CPC .......... *B60L 15/2036* (2013.01); *B62D 13/06* (2013.01); *B60L 2200/28* (2013.01); *B60L 2240/24* (2013.01); *B60L 2240/423* (2013.01)

(58) Field of Classification Search
CPC ............. B60L 15/2036; B60L 2200/28; B60L 2240/24; B60L 2240/423; B62D 13/06
See application file for complete search history.

(56) References Cited

U.S. PATENT DOCUMENTS

| | | | | |
|---|---|---|---|---|
| 4,078,500 A | * | 3/1978 | Zuppiger | B61B 12/105 104/173.1 |
| 6,516,925 B1 | * | 2/2003 | Napier | B60T 8/1708 188/112 A |
| 6,607,207 B2 | * | 8/2003 | Shapiro | B62K 9/00 280/287 |
| 9,216,763 B2 | * | 12/2015 | Huntzinger | B60L 15/2036 |
| 9,931,254 B2 | * | 4/2018 | Halsall | A61G 5/128 |
| 10,486,052 B2 | * | 11/2019 | Choi | A63C 17/12 |
| 10,908,045 B2 | * | 2/2021 | Coulter | G05D 1/0274 |
| 11,338,673 B1 | * | 5/2022 | McCoy | B60K 1/04 |

(Continued)

*Primary Examiner* — Gertrude Arthur Jeanglaude
(74) *Attorney, Agent, or Firm* — MCDONNELL BOEHNEN HULBERT & BERGHOFF LLP (57) ABSTRACT

A first mobility device includes a plurality of first wheels, a first drive motor providing a driving force to the plurality of first wheels, a first high-voltage battery supplying power to the at least one first drive motor, and a first pivot mechanism, and a second mobility device include a second left wheel, a second right wheel, a second drive motor providing a driving force to the second left wheel and the second right wheel, a second high-voltage battery supplying power to the second drive motor, and a second pivot mechanism. A method of controlling the backward driving of the mobility devices includes determining the backward driving of the first mobility device, determining a posture of the second mobility device with respect to the first mobility device, and controlling the at least one second drive motor according to the posture to perform reverse steering of the second mobility device.

20 Claims, 7 Drawing Sheets

(56) References Cited

U.S. PATENT DOCUMENTS

2013/0197732 A1* 8/2013 Pearlman ................. A61G 5/00
                                                    701/1
2019/0152330 A1* 5/2019 Lee ....................... B60L 3/0053
2024/0270082 A1* 8/2024 Ghannam ............... B60L 58/12

* cited by examiner

METHOD OF CONTROLLING DRIVING OF A PLURALITY OF MOBILITY DEVICES CONNECTED BY A PIVOT MECHANISM

CROSS REFERENCE TO RELATED APPLICATIONS

This application claims the benefit of Korean Patent Application No. 10-2023-0102734, filed on Aug. 7, 2023, which is hereby incorporated by reference as if fully set forth herein.

BACKGROUND

Technical Field

The present disclosure relates to an add-on mobility device connected to an electric vehicle through a pivot mechanism to drive together.

Discussion of the Related Art

It is general that an electric vehicle is driven with its wheels driven by a driving force of a drive motor.

It is also general that a high-voltage battery is fixedly mounted on the vehicle to supply power to the drive motor.

The drive motor may be an alternating current (AC) motor and may thus include an inverter between the battery and the drive motor.

When the battery of the electric vehicle requires charging according to its state of charge, i.e., SOC, it may be charged by receiving external power through an on-board charger (OBC).

In this case, charging time may be determined depending on a charging method, which is broadly divided into slow charging and fast charging.

Recent unremitted research and development on batteries have greatly improved a driving range per charge.

However, a battery fixedly mounted on an electric vehicle alone may still be insufficient, and an alternative is therefore required.

SUMMARY

To solve the technical issues described above, an object of the present disclosure is to provide a technology of a new concept using, in addition to a battery (hereinafter a "main battery" for the convenience of description) installed in an electric vehicle, a battery (hereinafter a "replaceable battery" to distinguish it from the main battery) added to or removed from a power system of the electric vehicle as needed.

In addition, an object of the present disclosure is to provide a mobility device that may drive actively itself, being mechanically and removably connected to an electric vehicle and including a replaceable battery added to and removed from a power system of the electric vehicle.

In addition, an object of the present disclosure is to provide a technology for controlling reverse steering of a mobility device capable of active driving when an electric vehicle travels backward.

According to an aspect of the present disclosure, there is provided a driving control method for a plurality of mobility devices connected to each other by a pivot mechanism, the plurality of mobility devices comprising a first mobility device which comprises a plurality of first wheels, at least one first drive motor providing a driving force to the plurality of first wheels, a first high-voltage battery supplying power to the at least one first drive motor, and a first pivot mechanism, and a second mobility device which comprises a second left wheel, a second right wheel, at least one second drive motor providing a driving force to the second left wheel and the second right wheel, a second high-voltage battery supplying power to the at least one second drive motor, and a second pivot mechanism mechanically connected to the first pivot mechanism, the driving control method comprising determining a backward driving of the first mobility device, determining a posture of the second mobility device with respect to the first mobility device, and controlling the at least one second drive motor according to the posture to perform reverse steering of the second mobility device.

The first mobility device may further include a first controller, at least one electric device that operates at a low voltage, a low-voltage battery that supplies power to the at least one electric device, a first direct current (DC) to DC (DC/DC) converter connected between the first high-voltage battery and the low-voltage battery, a second DC/DC converter connected to the first high-voltage battery, and a first connector connected to the second DC/DC converter, wherein the first controller may be configured to control the second DC/DC converter based on a state of the first high-voltage battery and a state of the second high-voltage battery to charge the first high-voltage battery with power of the second high-voltage battery, and the second mobility device may further include a third connector electrically and removably connected to the first connector and connected to the second high-voltage battery.

The driving control method may further include controlling the at least one second drive motor according to a forward driving speed of the first mobility device to allow the second mobility device to perform forward straight driving.

The determining of the posture may include determining the posture according to a first distance between a rear left side of the first mobility device and a front left side of the second mobility device and a second distance between a rear right side of the first mobility device and a front right side of the second mobility device.

The determining of the posture may further include obtaining an image including a rear portion of the first mobility device and a front portion of the second mobility device, and determining the first distance and the second distance through image processing on the image.

The determining of the posture may further include determining a sensing error through a center distance between a center of the rear portion of the first mobility device and a center of the front portion of the second mobility device, and through the first distance and the second distance.

The at least one second drive motor may include a second left drive motor that provides a driving force to the second left wheel and a second right drive motor that provides a driving force to the second right wheel, wherein the performing of the reverse steering of the second mobility device may include: in response to the first distance being less than the second distance, adding a backward driving torque of the second left drive motor; and in response to the first distance being greater than the second distance, adding a backward driving torque of the second right drive motor.

The driving control method may further include determining whether the backward driving of the first mobility device is straight driving using a steering angle sensor signal of the first mobility device.

According to an aspect of the present disclosure, there is provided a second mobility device mechanically connected to and capable of driving together with a first mobility device which comprises a plurality of first wheels, at least one first drive motor providing a driving force to the plurality of first wheels, a first high-voltage battery supplying power to the at least one first drive motor, a first controller controlling the at least one first drive motor, and a first pivot mechanism, the second mobility device comprising a frame including a second pivot mechanism mechanically connected to the first pivot mechanism, a second left wheel installed on a left side of the frame, a second right wheel installed on a right side of the frame, at least one second drive motor providing a driving force to the second left wheel and the second right wheel, a second high-voltage battery supplying power to the at least one second drive motor, and a second controller controlling the at least one second drive motor, wherein the second controller may be configured to, during backward driving of the first mobility device, control the at least one second drive motor according to a posture of the second mobility device with respect to the first mobility device to perform reverse steering of the second mobility device.

The first mobility device may further include at least one electric device that operates at a low voltage, a low-voltage battery that supplies power to the at least one electric device, a first DC/DC converter connected between the first high-voltage battery and the low-voltage battery, a second DC/DC converter connected to the first high-voltage battery, and a first connector connected to the second DC/DC converter, wherein the first controller may be configured to control the second DC/DC converter according to a state of the first high-voltage battery and a state of the second high-voltage battery to charge the first high-voltage battery with the power of the second high-voltage battery, and the second mobility device may be connected to the second high-voltage battery and may further include a third connector electrically and removably connected to the first connector.

The second controller may be configured to control the at least one second drive motor according to a forward driving speed of the first mobility device to perform forward straight driving of the second mobility device.

The posture may be determined according to a first distance between a rear left side of the first mobility device and a front left side of the second mobility device and a second distance between a rear right side of the first mobility device and a front right side of the second mobility device.

The first distance and the second distance may be determined through image processing on an image including a rear portion of the first mobility device and a rear portion of the second mobility device.

The second controller may be configured to determine a sensing error through a center distance between a center of the rear portion of the first mobility device and a center of the front portion of the second mobility device and the first distance and the second distance.

The at least one second drive motor may include a second left drive motor that provides a driving force to the second left wheel and a second right drive motor that provides a driving force to the second right wheel, wherein the second controller may be configured to, in response to the first distance being less than the second distance, adding a backward driving torque of the second left drive motor, and in response to the first distance being greater than the second distance, adding a backward driving torque of the second right drive motor.

The second controller may be configured to determine whether the backward driving of the first mobility device is straight driving according to steering angle information of the first mobility device.

According to an aspect of the present disclosure, there is provided a first mobility device including a plurality of first wheels, at least one first drive motor that provides a driving force to the plurality of first wheels, a first high-voltage battery that supplies power to the at least one first drive motor, a first controller that controls the first drive motor, and a first pivot mechanism, wherein the first controller may be configured to, while a second pivot mechanism of a second mobility device and the first pivot mechanism are in a mechanical connection, control the first drive motor to allow the first mobility device to perform backward driving, and during the backward driving of the first mobility device, transmit, to the second mobility device, posture information of the second mobility device with respect to the first mobility device.

The posture information may include a first distance between a rear left side of the first mobility device and a front left side of the second mobility device and a second distance between a rear right side of the first mobility device and a front right side of the second mobility device.

The first mobility device may further include a camera that obtains an image including a rear portion of the first mobility device and a front portion of the second mobility device, wherein the first controller may be configured to determine the first distance and the second distance through image processing on the image.

The first controller may be configured to transmit steering angle information of the first mobility device to the second controller.

According to an embodiment of the present disclosure, in a plurality of mobilities mechanically connected through a pivot mechanism, backward driving may be smoothly performed through active reverse steering of a rear mobility device when a front mobility device travels backward.

DETAILED DESCRIPTION

Hereinafter, embodiments of the present disclosure will be described in detail with reference to the accompanying drawings, and the same or similar elements will be given the same reference numerals regardless of reference symbols, and repeated description thereof will be omitted.

The terms "module," "unit," and/or "-er/or" for referring to elements are assigned and used interchangeably in consideration of the convenience of description, and thus the terms per se do not necessarily have different meanings or functions. The terms "module," "unit," and/or "-er/or" do not necessarily require physical separation.

Although terms including ordinal numbers, such as "first," "second," and the like, may be used herein to describe various elements, the elements are not limited by these terms. These terms are only used to distinguish one element from another.

The term "and/or" is used to include any combination of multiple items that are subject to it. For example, "A and/or B" may include all three cases, for example, "A," "B," and "A and B."

When an element is described as "coupled" or "connected" to another element, the element may be directly coupled or connected to the other element. However, it is to be understood that another element may be present therebetween. In contrast, when an element is described as "directly coupled" or "directly connected" to another element, it is to be understood that there are no other elements therebetween.

The singular forms "a," "an," and "the" are intended to include the plural forms as well, unless the context clearly indicates otherwise. It is to be further understood that the terms "comprises/comprising" and/or "includes/including" used herein specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In addition, the term "unit" or "control unit" is merely a widely used term for naming a controller that controls a specific vehicle function, and does not mean a generic functional unit. For example, each controller may include a communication device that communicates with another controller or a sensor to control a function assigned thereto, a memory that stores an operating system (OS), a logic command, input/output information, and the like, and one or more processors that perform determination, calculation, decision, and the like that are necessary for controlling a function assigned thereto.

Meanwhile, a processor may include a semiconductor integrated circuit and/or electronic devices that perform at least one or more of comparison, determination, computation, operations, and decision to achieve programmed functions. The processor may be, for example, any one or a combination of a computer, a microprocessor, a central processing unit (CPU), an application-specific integrated circuit (ASIC), and an electronic circuit (e.g., circuitry and logic circuits).

In addition, computer-readable recording media (or simply memory) include all types of storage devices that store data readable by a computer system. The storage devices may include at least one type of, for example, flash memory, hard disk, micro-type memory, card-type (e.g., secure digital (SD) card or extreme digital (XD) card) memory, random-access memory (RAM), static RAM (SRAM), read-only memory (ROM), programmable ROM (PROM), electrically erasable PROM (EEPROM), magnetic RAM (MRAM), magnetic disk, or optical disc.

This recording medium may be electrically connected to the processor, and the processor may load and record data from the recording medium. The recording medium and the processor may be integrated or may be physically separated.

Hereinafter, the accompanying drawings will be briefly described, and embodiments of the present disclosure will be described in detail with reference to the accompanying drawings.

Figure 1:
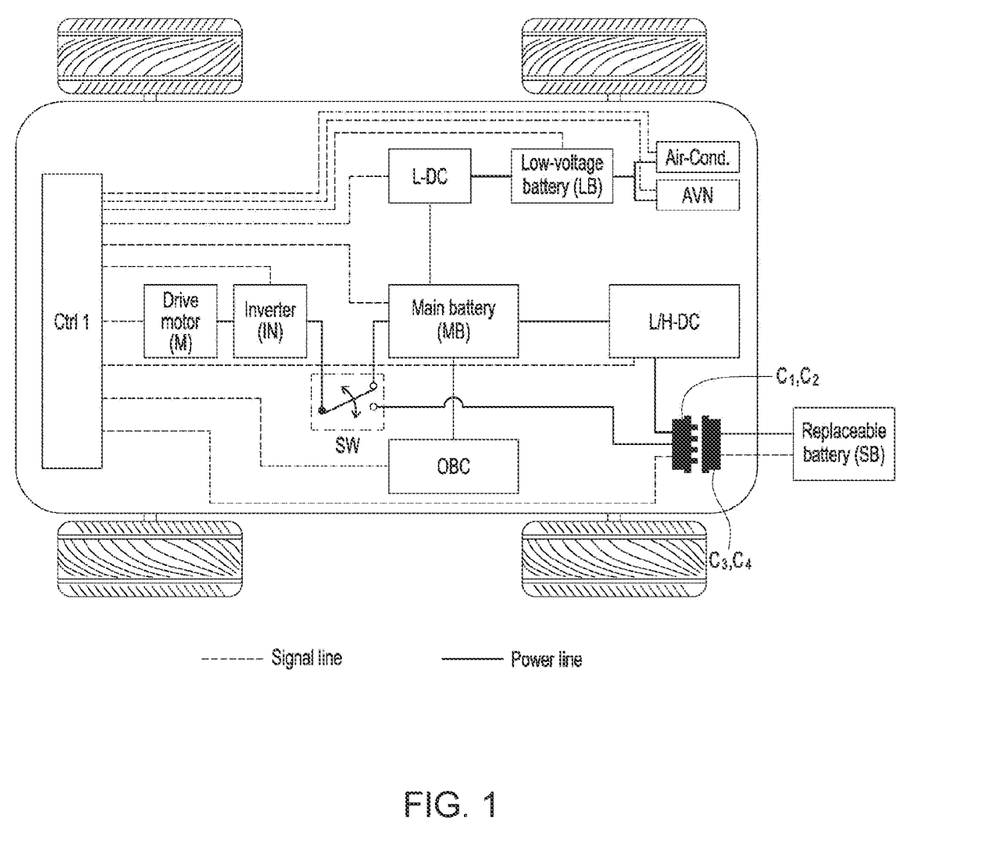
FIG. 1 is a diagram illustrating a power system of a first mobility device (e.g., an electric vehicle) according to an embodiment of the present disclosure.
Figure 2:
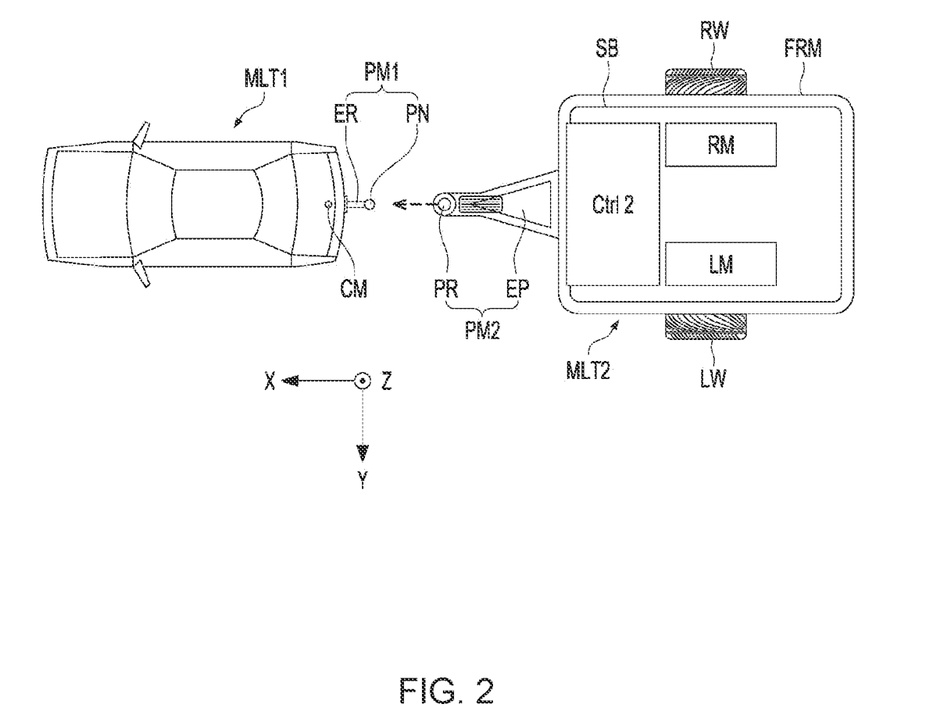
FIG. 2 is a diagram illustrating a connection between a first mobility device and a second mobility device according to an embodiment of the present disclosure.

FIG. 1 conceptually shows a power system of a first mobility device MLT1 (e.g., an electric vehicle) according to an embodiment of the present disclosure, and FIG. 2 shows a second mobility device MLT2 connected to the first mobility device MLT1.

Respective structures of the first mobility device MLT1 and the second mobility device MLT2 will be described hereinafter with reference to FIGS. 1 and 2, and then a control method according to an embodiment of the present disclosure will be described hereinafter with reference to FIG. 3.

As shown in FIG. 1, according to an embodiment of the present disclosure, the first mobility device MLT1 may be, for example, an electric vehicle, and include a first drive motor M, an inverter IN, a main battery MB, and an on-board charger (OBC), a first direct current (DC) to DC (DC/DC) converter L-DC, a low-voltage battery LB, an air conditioning unit Air-cond and an audio video navigation (AVN) that operate at a low voltage, a second DC/DC converter L/H-DC, a switch SW, and a controller (hereinafter, a first controller).

The first drive motor M may provide a driving force to the wheels of the vehicle and may be, for example, an alternating current (AC) motor.

The inverter IN may convert DC power supplied to the first drive motor M into AC.

The main battery MB (e.g., a first high-voltage battery) may be a high-voltage battery and may be fixedly installed in the vehicle, for example, under a cabin floor.

The main function of the main battery MB is to supply electric power to the first drive motor M and may be charged with the OBC.

Additionally, the main battery MB may be connected to the low-voltage battery LB through the first DC/DC converter L-DC to charge the low-voltage battery LB.

For charging the low-voltage battery LB, the first DC/DC converter L-DC may be a step-down lower DC/DC converter (LDC).

The low-voltage battery LB may be, for example, a 12V or 24V battery, and may supply electric power to electrical devices in the vehicle, such as the air conditioning unit or the AVN that operates at a low voltage.

A replaceable battery SB (e.g., a second high-voltage battery) shown in FIG. 1 may be a high-voltage battery and may be installed in the second mobility device MLT2 to be described below.

The replaceable battery SB may be electrically connected to a power system of the vehicle including the main battery MB in an auxiliary way, that is, in a way that it is separable without having any effect on the operation (e.g., supplying power to electronic parts, the drive motor, and the like of the vehicle) of the power system, in a wired manner (or a wireless manner within the possible range).

The replaceable battery SB may also be referred to as an auxiliary battery, an extended battery, and a second or secondary battery, but this is only to distinguish it from the main battery MB. That is, however, by its name, the replaceable battery SB may not be limited in its functions, features, mechanical/electrical/chemical structures of its own or based on a relationship with other objects (including the main battery MB, a host vehicle, etc.), a battery type (including a packaging type, anode/cathode/separator material, etc.), a charging method, and the like.

The replaceable battery SB may be communicatively connected, in a wired or wireless manner, to a first controller Ctrl1 of the first mobility device MLT1 which is a host vehicle, or to a battery management system (BMS) of the main battery MB described below. Through this, various sensing information (e.g., voltage, current, temperature, etc.) associated with a state of charge (SOC) and a physical/electrical/chemical state of the replaceable battery SB may be transmitted to the first controller Ctrl1. However, examples are not necessarily limited thereto, and such information associated with the replaceable battery SB may be transmitted to the first controller Ctrl1 through the second controller Ctrl2 of the second mobility device MLT2 to be described below.

In this embodiment, the high-voltage battery applied to the main battery MB and the replaceable battery SB may include a plurality of battery cells (not shown) that output a unit voltage within, for example, 2.7V to 4.2V, and the plurality of battery cells, which is provided as a set number of battery cells, may be connected in series/parallel to each other to form one module. The high-voltage battery may be packaged in one battery package with one or more battery modules being connected in series/parallel to output a desired output voltage, for example, approximately 400V, 800V, or several kV.

The high-voltage battery of the main battery MB and the replaceable battery SB may include a BMS.

The BMS may include a battery management unit (BMU), a cell monitoring unit (CMU), and a battery junction box (BJB).

The BMS may perform a cell balancing function to maintain the voltage of each cell to be constant and ensure the performance of the entire battery pack, an SOC function to calculate the capacity of the entire battery system, and battery cooling, charging, and discharging control functions.

The BMU may perform the functions of the BMS by receiving information about all the cells from the CMU.

For example, the BMU may include two micro control units (MCUs), and each of the MCUs may have one controller area network (CAN) communication port. It may also include a CAN interface for communicating with a vehicle controller which may be an upper device of the BMS, and a CAN interface for collecting information from the CMU which may be a lower device of the BMS.

The CMU may be attached directly to a battery cell to sense voltage, current, and temperature. The CMU may perform simply sensing without performing calculations related to a BMS algorithm. For example, a single CMU may be connected to multiple battery cells and may transmit information of each cell to the BMU through the CAN interface.

The BJB may be a pack-level sensing mechanism of the BMS and a connection medium between the high-voltage battery and a drive system. It may measure and record a battery voltage and current flowing into and out of the battery to accurately calculate an SOC. The BJB may also perform safety-critical functions such as contactor and insulation monitoring, in addition to overcurrent detection.

The replaceable battery SB may be a high-voltage battery with a lower voltage than that of the main battery MB, and in this case, the second DC/DC converter L/H-DC may be a step-up DC/DC converter. Also, on the contrary, the replaceable battery SB may be a high-voltage battery with a higher voltage than that of the main battery MB, and in this case, the second DC/DC converter L/H-DC may be a step-down DC/DC converter.

In this embodiment, the second DC/DC converter L/H-DC may be included as a built-in component in the first mobility device MLT1 in the power system, but is not limited thereto. For example, unlike this embodiment, the second DC/DC converter L/H-DC may be provided as a separate component and may be additionally and removably connected to the power system.

In this embodiment, for the removable electrical connection of the replaceable battery SB to the power system, the power system of the first mobility device MLT1 may include a first connector C1 and a second connector C2, and the replaceable battery SB may include a third connector C3 and a fourth connector C4.

For example, the first and second connectors C1 and C2 may be an integrated connector, and the third and fourth connectors C3 and C4 may also be an integrated connector.

The first connector C1 may be connected to the second DC/DC converter L/H-DC, and the second connector C2 may be connected to the switch SW.

Although not shown, it may also be possible that a signal transfer connector may be added to transmit various sensing and state information of the replaceable battery SB to the controller.

The switch SW may be fixedly and electrically connected to the inverter IN, and may be switched between the main battery MB and the second connector C2 to electrically connect the inverter IN and the main battery MB or to electrically connect the inverter IN and the replaceable battery SB.

In this embodiment, the first controller Ctrl1 may be an uppermost vehicle controller that controls all the electric devices of the first mobility device MLT1 but is not necessarily limited thereto. That is, for example, the first controller Ctrl1 of FIG. 1 may be a power controller lower than the vehicle controller.

In addition, as described above, the first controller Ctrl1 may include a computer-readable recording medium that stores an operating system (OS), logic commands, input/output information, and the like, and at least one processor that reads them to perform at least one of selection, calculation, and determination necessary for controlling a corresponding function.

In addition, in this embodiment, the main battery MB may be connected to the inverter IN through the switch SW but is not necessarily limited thereto, and the main battery MB may be connected directly to the inverter IN without the switch SW. In this case, the second connector and the fourth connector of the replaceable battery SB may not be required.

The replaceable battery SB shown in FIG. 1 may be installed in the second mobility device MLT2, as shown in FIG. 2.

The second mobility device MLT2 may include a frame FRM, a second left wheel LW installed on the left side of the frame FRM, a second right wheel RW installed on the right side of the frame FRM, a second left drive motor LM that provides a driving force to the second left wheel LW, a second right drive motor RM that provides a driving force to the second right wheel RW, and a second controller Ctrl2.

The replaceable battery SB may be fixedly installed in the second mobility device MLT2 but is not necessarily limited thereto. That is, the replaceable battery SB may be removably installed in the second mobility device MLT2. This may allow the replaceable battery SB with an SOC, when mounted on the frame FRM, is in a fully discharged state to be removed and replaced with a new replaceable battery SB whose SOC is in a fully charged state.

When the replaceable battery SB is fixedly installed in the second mobility device MLT2, the second mobility device MLT2 may include a charging connector for charging the replaceable battery SB.

The frame FRM may form the exterior of the second mobility device MLT2 and serve to accommodate other components.

The frame FRM may include a second pivot mechanism PM2, and the second pivot mechanism PM2 may be separably and pivotably connected to a first pivot mechanism PM1 fixed to a vehicle body of the first mobility device MLT1.

For example, the first pivot mechanism PM1 may include an extension rod ER extending backward from the vehicle body of the first mobility device MLT1 and a pivot pin PN protruding upward from an end of the extension rod ER.

In addition, the second pivot mechanism PM2 may include a triangular extension part EP protruding forward from the frame FRM of the second mobility device MLT2 and a pivot ring PR that allows the pivot pin PN to be rotatably inserted at an end of the extension part EP.

The pivot pin PN may be limited in its linear movement while inserted in the pivot ring PR, but may rotate only about a Z-axis direction shown in FIG. 2. Therefore, in such a pivot-connected state, the second mobility device MLT2 may be restricted from a linear movement about a pivot connection point with respect to the first mobility device MLT1 and may only rotate about a Z axis.

When driving in a forward direction, i.e., in an X-axis direction, the first mobility device MLT1 and the second mobility device MLT2 may maintain their straightness without requiring separate steering control of the second mobility device MLT2. However, when the first mobility device MLT1 drives in a backward direction, the straightness may not be secured without controlling steering of the second mobility device MLT2, which will be described in detail below.

A rotation axis of the second left drive motor LM may be connected to the second left wheel LW, which may allow the second left drive motor LM to provide a driving force to the second left wheel LW.

In addition, a rotation axis of the second right drive motor RM may be connected to the second right wheel RW, which may allow the second right drive motor RM to provide a driving force to the second right wheel RW.

Since the second left wheel LW and the second right wheel RW are respectively connected to the second left drive motor LM and the second right drive motor RM, they may be driven independently.

The second left drive motor LM and the second right drive motor RM may be driven in the forward and reverse directions, respectively. When driven in the forward direction, the second mobility device MLT2 may travel forward, and when driven in the reverse direction, the second mobility device MLT2 may travel backward.

For example, the second left drive motor LM and the second right drive motor RM may each be implemented as an in-wheel drive system in which respective drive motors are installed within the wheels, but examples are not necessarily limited thereto.

In addition, unlike this embodiment, the left and right sides of the second mobility device MLT2 are not driven independently, but the power of one common motor may be transmitted to the second left wheel LW and the second right wheel RW by being divided and distributed thereto. To this end, a differential gear may be included between such a common second drive motor and the second left wheel LW and the second right wheel RW. That is, the power of the common second drive motor may be distributed by the differential gear and transmitted to the second left wheel LW and the second right wheel RW. In this case, a torque vectoring means may be added to distribute a torque between the second left wheel LW and the second right wheel RW.

The second controller Ctrl2 may control the second left drive motor LM and the second right drive motor RM to enable forward and backward driving of the second mobility device MLT2. In addition, the second controller Ctrl2 may change a traveling (or driving) direction of the second mobility device MLT2 by controlling the torque or rotation count of the second left drive motor LM and the second right drive motor RM. That is, controlling the driving of the second left drive motor LM and the second right drive motor RM independently may enable steering of the second mobility device MLT2 without a separate steering device.

In addition, as described above, a wired or wireless communication means for transferring information between the connectors of FIG. 1 and the first mobility device MLT1 and the second mobility device MLT2 may be included.

In this embodiment, the first controller Ctrl1 or the second controller Ctrl2 may include a memory and a processor. The memory may store computer instructions for performing functions of the corresponding controllers, and the processor may perform the foregoing functions by loading the instructions from the memory and executing them.

The memory may include at least one of, for example, a hard disk drive (HDD), a solid-state drive (SDD), a silicon disk drive (SDD), read-only memory (ROM), random-access memory (RAM), compact disc ROM (CD-ROM), a magnetic tape, a floppy disk, and an optical data storage device.

In addition, the processor may include at least one of, for example, a computer, a microprocessor, a central processing unit (CPU), an application-specific integrated circuit (ASIC), an electric circuit, and a logic circuit.

As the first connector C1 and the second connector C2 of the first mobility device MLT1 and the third connector C3 and the fourth connector C4 of the second mobility device MLT2 are connected, and the signal transfer connector (not shown) is connected, the first mobility device MLT1 and the second mobility device MLT2, that is, the first controller Ctrl1 and the second controller Ctrl2, may enter a state in which they communicate with each other.

When the first mobility device MLT1 starts traveling forward, while the first mobility device MLT1 and the second mobility device MLT2 are in mechanical and electrical connection, the second controller Ctrl2 may control the second left drive motor LM and the second right drive motor RM according to the driving speed to allow the second mobility device MLT2 to perform forward straight driving.

In this case, some or all of the speed, gear position, steering angle, accelerator pedal sensor (APS) information, and brake pedal sensor (BPS) information of the first mobility device MLT1 may be transmitted to the second mobility device MLT2.

For example, the second controller Ctrl2 of the second mobility device MLT2 may use some or all of the speed, gear position, APS information, and BPS information of the first mobility device MLT1 to determine whether the first mobility device MLT1 is in a forward driving state or a backward driving state. However, examples are not limited thereto, and the second controller Ctrl2 of the second mobility device MLT2 may receive information as to whether the first mobility device MLT1 is in the forward driving state or the backward driving state directly from the first controller Ctrl1.

When the first mobility device MLT1 is traveling forward, the second controller Ctrl2 may drive the second left drive motor LM and the second right drive motor RM in the forward direction to allow the second mobility device MLT2 to perform forward straight driving. In addition, when the first mobility device MLT1 is traveling backward, the second controller Ctrl2 may drive the second left drive motor LM and the second right drive motor RM in the reverse direction to allow the second mobility device MLT2 to perform backward driving.

In addition, the second controller Ctrl2 may determine a steering state based on steering angle information of the first mobility device MLT1 and may thus perform steering of the second mobility device MLT2 accordingly.

The second mobility device MLT2 may not include a separate steering device but may perform the steering through torque control for the second left drive motor LM and the second right drive motor RM.

That is, the second controller Ctrl2 may calculate a driving torque for driving and a steering torque for steering for each of the second left drive motor LM and the second right drive motor RM and use the calculated torque for control.

For example, to achieve the steering of the second mobility device MLT2, steering torque values of the second left drive motor LM and the second right drive motor RM according to steering angles of the first mobility device MLT1 may be included in a lookup table or calculation program.

During the forward straight driving, the speed of the second mobility device MLT2 may be controlled not to be greater than that of the first mobility device MLT1. Thus, the pivot connection between the first mobility device MLT1 and the second mobility device MLT2 may be maintained within a predetermined pivot angle range. For example, when the speed of the second mobility device MLT2 is controlled not to be greater than that of the first mobility device MLT1 during the forward straight driving, a pivot angle of the second mobility device MLT2 with respect to the first mobility device MLT1 at a pivot connection point may be maintained at 0 degrees (°) (i.e., an angle at which the first mobility device MLT1 and the second mobility device MLT2 are in a straight line.

During the forward driving, the second mobility device MLT2 may be controlled to follow the first mobility device MLT1, which may enable smooth connected driving of multiple mobilities.

However, when driving backward, the second mobility device MLT2 may be located ahead in a driving direction, and thus controlling only the following driving may not be sufficient to achieve smooth driving.

For smooth backward driving, monitoring and controlling the posture of the second mobility device MLT2 may be required. Hereinafter, a backward driving control method according to an embodiment of the present disclosure will be described in detail with reference to FIGS. 3 and 4.

Figure 3:
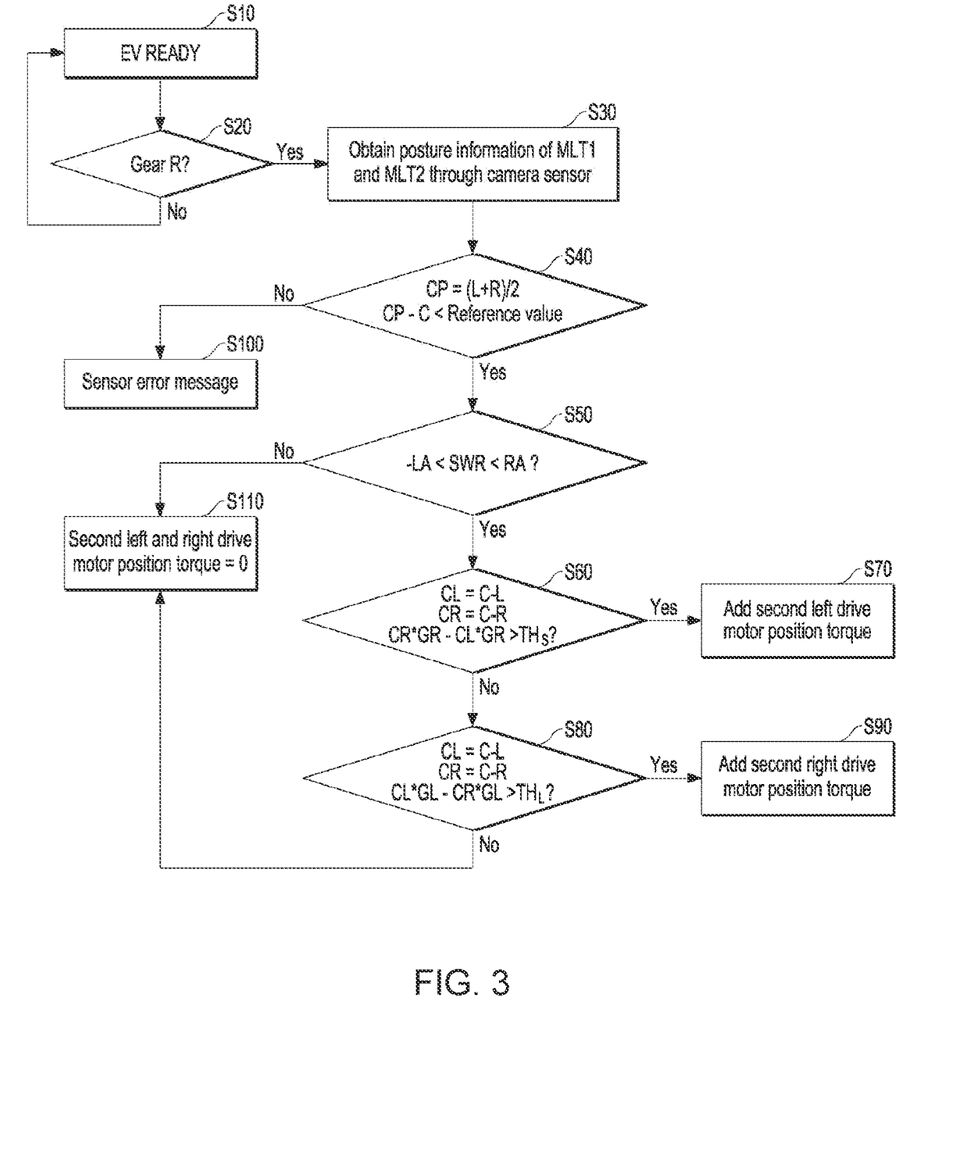
FIG. 3 is a flowchart illustrating a control method according to an embodiment of the present disclosure.

First, step S10 of FIG. 3 indicates that a power state of the first mobility device MLT1 is an "EV Ready" state, which is a state in which the electric vehicle in in a drivable state.

Figure 4:
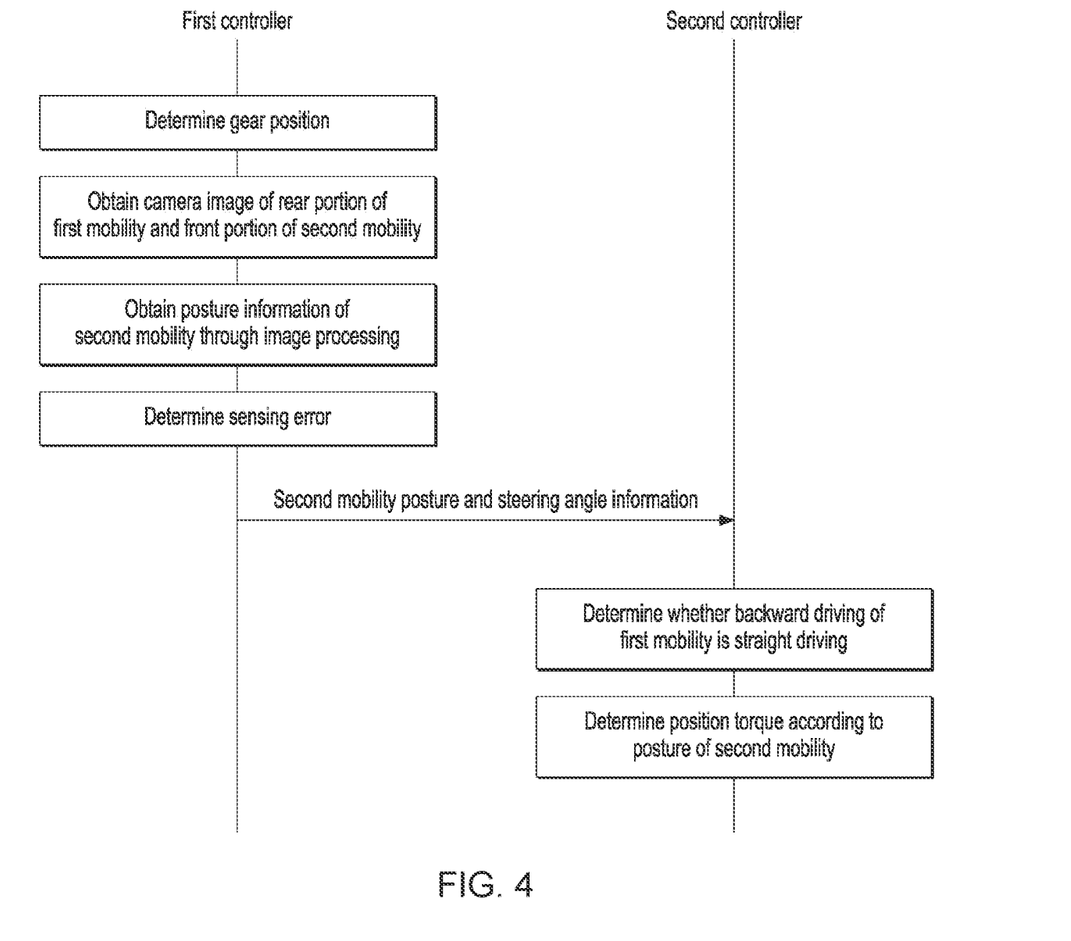
FIG. 4 is a diagram illustrating an interoperating relationship between a first controller and a second controller in a control method according to an embodiment of the present disclosure.

As shown in FIG. 4, the first controller Ctrl1 may determine whether a gear position is at a reverse gear "R" in step S20 of FIG. 3, and accordingly determine whether the first mobility device MLT1 travels backward.

Figure 5:
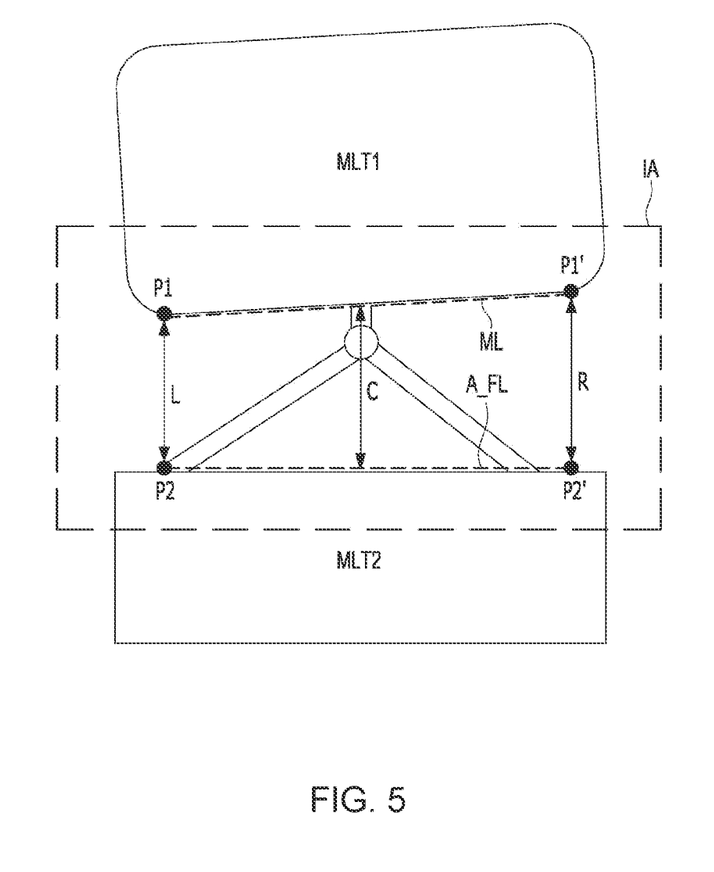
FIG. 5 is a diagram illustrating a posture of a second mobility device with respect to a first mobility device according to an embodiment of the present disclosure.

When it is determined to be in a backward driving state in step S20, the first controller Ctrl1 may obtain an image of a rear portion of the first mobility device MLT1 and an image of a front portion of the second mobility device MLT2 using a rear camera CM of the first mobility device MLT1, as shown in FIG. 5.

In step S30, the first controller Ctrl1 may perform predetermined image processing on the obtained images and obtain posture information of the second mobility device MLT2.

FIG. 5 conceptually shows a camera capture area IA from which the images of the rear portion of the first mobility device MLT1 and the front portion of the second mobility device MLT2 are obtained. FIG. 5 shows a top view image but is not necessarily limited thereto. It is obvious that the view direction of an image may vary depending on the position of the camera CM.

The predetermined image processing may be performed on the image of the capture area IA of FIG. 5, and a left distance L, a right distance R, and a center distance C between the first mobility device MLT1 and the second mobility device MLT2 may be obtained as the posture information.

The left distance L may indicate a distance between a rear left point P1 of the first mobility device MLT1 and a front left point P2 of the second mobility device MLT2, the right distance R may indicate a distance between a rear right point P1' of the first mobility device MLT1 and a front right point P2' of the second mobility device MLT2, and the center distance C may indicate a distance between a rear center of the first mobility device MLT1 and a front center of the second mobility device MLT2.

The left point P1 and the right point P1' of the first mobility device MLT1 may be predetermined. For example, the left point P1 and the right point P1' of the first mobility device MLT1 may be left and right end points of the rear portion of the first mobility device MLT1, respectively. Alternatively, the left point P1 and the right point P1' of the first mobility device MLT1 may be previously marked points on the vehicle body of the first mobility device MLT1.

The left point P2 and the right point P2' of the front portion of the second mobility device MLT2 may be left and right end points of the front portion of the second mobility device MLT2, respectively. Alternatively, the left point P2 and right point P2' of the front portion of the second mobility device MLT2 may be defined as points obtained as the left point P1 and the right point P1' of the rear portion of the first mobility device MLT1 are projected onto the front portion of the second mobility device MLT2 while the first mobility device MLT1 and the second mobility device MLT2 are aligned to have a pivot angle of zero (0) degrees (°), i.e., in a straight line. Alternatively, the left point P2 and the right point P2' of the front portion of the second mobility device MLT2 may be points previously marked on the body of the second mobility device MLT2, respectively.

In step S40, when the posture information is obtained in step S30, the first controller Ctrl1 may determine an average distance CP of the left distance L and the right distance R and compare, to a reference value, a difference between the average distance CP and the center distance C.

When the difference between the average distance CP and the center distance C is greater than and equal to the reference value in step S40 (i.e., No in S40), the first controller Ctrl1 may determine that there is a sensor error and output a sensor error message in step S100.

When the difference between the average distance CP and the center distance C is less than the reference value in step S40 (i.e., Yes in S40), the first controller Ctrl1 may transmit, to the second controller Ctrl2, the obtained posture information and steering angle information of the first mobility device MLT1 as shown in FIG. 4.

It is obvious that the steering angle information may be obtained using a steering angle sensor signal of the first mobility device MLT1.

In step S50, the second controller Ctrl2 may determine whether the steering angle is within left set angle LA and right set angle RA ranges that are set with respect to 0° which indicates a straight driving state. The left set angle LA and the right set angle RA may be preset to a value slightly greater than 0 in consideration of a driver's steering wheel operation error and/or sensing error, and the like.

When the steering angle is within the set angle ranges in step S50 (i.e., Yes in S50), the second controller Ctrl2 may determine that the steering angle is in the straight state and perform step S60.

When the steering angle is out of the set angle ranges in step S50 (i.e., No in S50), the second controller Ctrl2 may determine a position torque for the second left drive motor LM and the second right drive motor RM to be 0 in step S110. In this case, the position torque refers to a torque for adjusting the position of the second mobility device MLT2 in addition to the driving torque and the steering torque.

In step S60, the second controller Ctrl2 may determine a first difference CL which is a difference between the left distance L and the center distance C and a second difference CR which is a difference between the right distance R and the center distance C, and determine whether a value obtained by multiplying a difference value between the first difference CL and the second difference CR by a predetermined first gain value GR exceeds a first reference value ThR.

When the value obtained by multiplying the difference value between the first difference CL and the second difference CR by the first gain value GR exceeds the first reference value ThR in step S60 (i.e., Yes in S60), the second controller Ctrl2 may determine to add the position torque of the second left drive motor LM in step S70.

In this case, the position torque may be determined from a predetermined lookup table or calculation formula according to the value obtained by multiplying the difference value between the first difference CL and the second difference CR by the first gain value GR.

When the value obtained by multiplying the difference value between the first difference CL and the second difference CR by the first gain value GR is less than or equal to the first reference value ThR in step S60 (i.e., No in S60), the second controller Ctrl2 may perform step S80.

When a value obtained by multiplying the difference value between the first difference CL and the second difference CR by a second gain value GL exceeds a second reference value ThL (i.e., Yes in S80), the second controller Ctrl2 may determine to add a position torque of the second right drive motor RM in step S90.

Likewise, the position torque may also be determined from a predetermined lookup table or calculation formula according to the value obtained by multiplying the difference value between the first difference CL and the second difference CR by the second gain value GL.

When the value obtained by multiplying the difference value between the first difference CL and the second difference CR by the second gain value GL is less than or equal to the second reference value ThL (i.e., No in S80), the second controller Ctrl2 may perform step S110.

The multiplication using the first gain value GR and the second gain value GL may amplify a difference between the first difference CL and the second difference CR, which may reduce the effects of the sensing error and the like.

Figure 6:
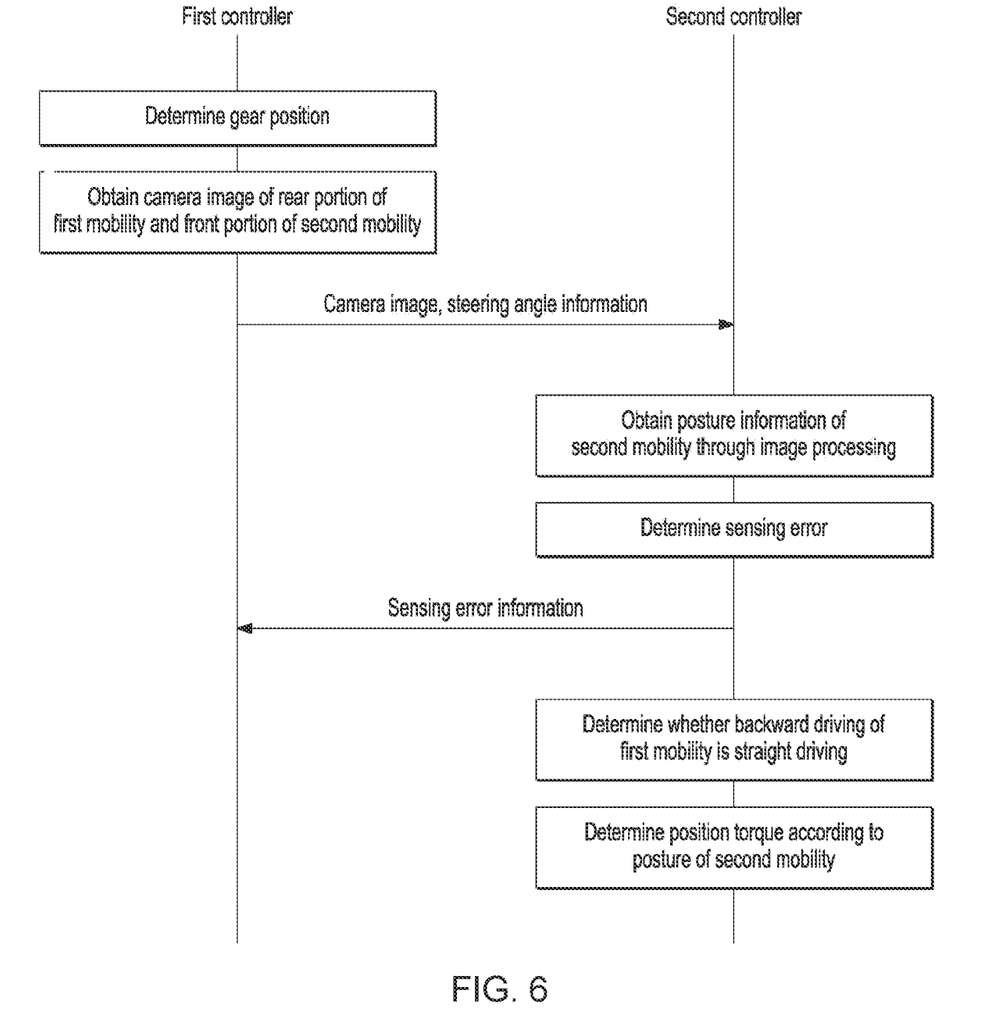
FIG. 6 is a diagram illustrating an interoperating relationship between a first controller and a second controller in a control method according to another embodiment of the present disclosure.

FIG. 6 is a diagram illustrating a control method according to another embodiment of the present disclosure.

In the method of FIG. 6, the first controller Ctrl1 may determine a gear position, and obtain a camera image and transmit it to the second controller Ctrl2, and the second controller Ctrl2 may obtain posture information through image processing and determine a sensing error.

In the method of FIG. 6, camera image acquisition in steps S10, S20, and S30 of the method shown in the flowchart of FIG. 3 may be performed by the first controller Ctrl1, and the remaining steps may be performed by the second controller Ctrl2.

In addition, FIG. 6 is a diagram illustrating a control method according to another embodiment of the present disclosure.

Figure 7:
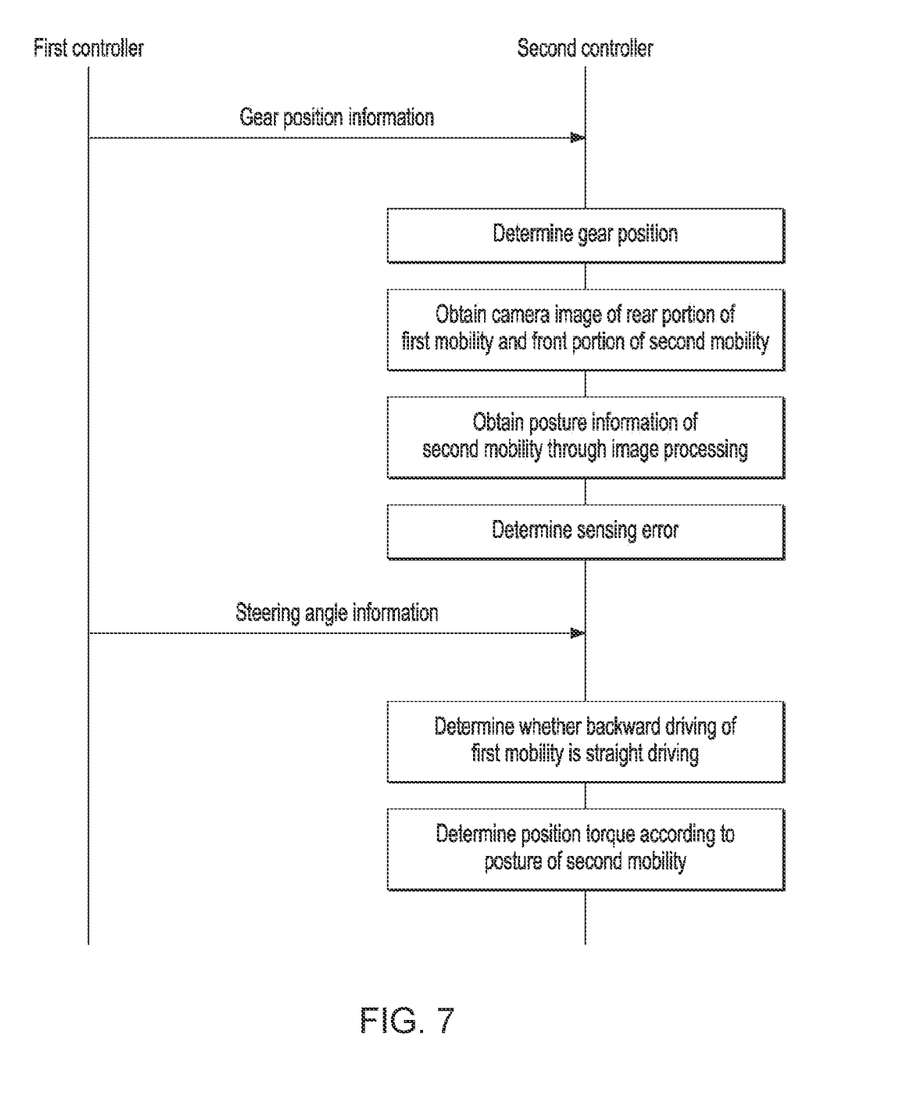
FIG. 7 is a diagram illustrating an interoperating relationship between a first controller and a second controller in a control method according to still another embodiment of the present disclosure.

In the method of FIG. 7, the first controller Ctrl1 may only transmit gear position information and steering angle information to the second controller Ctrl2. In this case, the camera that obtains the image described above may be included in the second mobility device MLT2.

In addition, unlike the foregoing embodiments, the second controller Ctrl2 may be integrated into the first controller Ctrl1, and components of the second mobility device MLT2 may be controlled directly by the integrated controller of the first mobility device MLT1.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The invention claimed is:

1. A driving control method for a plurality of mobility devices connected to each other by a pivot mechanism, the plurality of mobility devices comprising a first mobility device which comprises a plurality of first wheels, at least one first drive motor providing a driving force to the plurality of first wheels, a first high-voltage battery supplying power to the at least one first drive motor, and a first pivot mechanism, and a second mobility device which comprises a second left wheel, a second right wheel, at least one second drive motor providing a driving force to the second left wheel and the second right wheel, a second high-voltage battery supplying power to the at least one second drive motor, and a second pivot mechanism mechanically connected to the first pivot mechanism, the driving control method comprising:
- determining a backward driving of the first mobility device;
- determining a posture of the second mobility device with respect to the first mobility device; and
- controlling the at least one second drive motor according to the posture to perform reverse steering of the second mobility device.

2. The method of claim 1, wherein the first mobility device further comprises a first controller, at least one electric device that operates at a low voltage, a low-voltage battery that supplies power to the at least one electric device, a first direct current (DC) to DC (DC/DC) converter connected between the first high-voltage battery and the low-voltage battery, a second DC/DC converter connected to the first high-voltage battery, and a first connector connected to the second DC/DC converter,
- wherein the first controller is configured to control the second DC/DC converter according to a state of the first high-voltage battery and a state of the second high-voltage battery to charge the first high-voltage battery with power of the second high-voltage battery, and
- wherein the second mobility device further comprises a third connector electrically and removably connected to the first connector and connected to the second high-voltage battery.

3. The method of claim 2, further comprising:
- controlling the at least one second drive motor according to a forward driving speed of the first mobility device to allow the second mobility device to perform forward straight driving.

4. The method of claim 1, wherein determining the posture comprises:
- determining the posture according to a first distance between a rear left side of the first mobility device and a front left side of the second mobility device, and a second distance between a rear right side of the first mobility device and a front right side of the second mobility device.

5. The method of claim 4, further comprising:
- obtaining an image comprising a rear portion of the first mobility device and a front portion of the second mobility device; and
- determining the first distance and the second distance through image processing on the image.

6. The method of claim 5, wherein determining the posture further comprises:
- determining a sensing error through a center distance between a center of the rear portion of the first mobility device and a center of the front portion of the second mobility device, and the first distance and the second distance.

7. The method of claim 4, wherein the at least one second drive motor comprises a second left drive motor that provides a driving force to the second left wheel, and a second right drive motor that provides a driving force to the second right wheel,
- wherein the performing of the reverse steering of the second mobility device comprises:
- when the first distance is less than the second distance, adding a backward driving torque of the second left drive motor; and
- when the first distance is greater than the second distance, adding a backward driving torque of the second right drive motor.

8. The method of claim 7, further comprising:
- determining whether the backward driving of the first mobility device is straight driving using a steering angle sensor signal of the first mobility device.

9. A second mobility device mechanically connected to and capable of traveling together with a first mobility device which comprises a plurality of first wheels, at least one first drive motor providing a driving force to the plurality of first wheels, a first high-voltage battery supplying power to the at least one first drive motor, a first controller controlling the at least one first drive motor, and a first pivot mechanism, the second mobility device comprising:
- a frame comprising a second pivot mechanism mechanically connected to the first pivot mechanism;
- a second left wheel positioned on a left side of the frame;
- a second right wheel positioned on a right side of the frame;
- at least one second drive motor configured to provide a driving force to the second left wheel and the second right wheel;
- a second high-voltage battery configured to supply power to the at least one second drive motor; and
- a second controller configured to control the at least one second drive motor;
- wherein the second controller is configured to:
- during backward driving of the first mobility device, control the at least one second drive motor according to a posture of the second mobility device with respect to the first mobility device to perform reverse steering of the second mobility device.

10. The second mobility device of claim 9, wherein the first mobility device further comprises at least one electric device that operates at a low voltage, a low-voltage battery that supplies power to the at least one electric device, a first direct current (DC) to DC (DC/DC) converter connected between the first high-voltage battery and the low-voltage battery, a second DC/DC converter connected to the first high-voltage battery, and a first connector connected to the second DC/DC converter,
- wherein the first controller is configured to control the second DC/DC converter according to a state of the first high-voltage battery and a state of the second high-voltage battery to charge the first high-voltage battery with the power of the second high-voltage battery, and
- wherein the second mobility device further comprises a third connector electrically and removably connected to the first connector and connected to the second high-voltage battery.

11. The second mobility device of claim 10, wherein the second controller is configured to:
- control the at least one second drive motor according to a forward driving speed of the first mobility device to perform forward straight driving of the second mobility device.

12. The second mobility device of claim 9, wherein the posture is determined according to a first distance between a rear left side of the first mobility device and a front left side of the second mobility device, and a second distance between a rear right side of the first mobility device and a front right side of the second mobility device.

13. The second mobility device of claim 12, wherein the first distance and the second distance are determined through image processing on an image comprising a rear portion of the first mobility device and a rear portion of the second mobility device.

14. The second mobility device of claim 13, wherein the second controller is configured to:
  determine a sensing error through a center distance between a center of the rear portion of the first mobility device and a center of the front portion of the second mobility device and the first distance and the second distance.

15. The second mobility device of claim 12, wherein the at least one second drive motor comprises a second left drive motor that provides a driving force to the second left wheel and a second right drive motor that provides a driving force to the second right wheel,
  wherein the second controller is configured to:
    when the first distance is less than the second distance, add a backward driving torque of the second left drive motor; and
    when the first distance is greater than the second distance, add a backward driving torque of the second right drive motor.

16. The second mobility device of claim 15, wherein the second controller is configured to:
  determine whether the backward driving of the first mobility device is straight driving according to steering angle information of the first mobility device.

17. A first mobility device, comprising:
  a plurality of first wheels;
  at least one first drive motor configured to provide a driving force to the plurality of first wheels;
  a first high-voltage battery configured to supply power to the at least one first drive motor;
  a first controller configured to control the first drive motor; and
  a first pivot mechanism,
  wherein the first controller is configured to:
    while a second pivot mechanism of a second mobility device and the first pivot mechanism are in a mechanical connection, control the first drive motor to allow the first mobility device to perform backward driving; and
    during the backward driving of the first mobility device, transmit, to the second mobility device, posture information of the second mobility device with respect to the first mobility device.

18. The first mobility device of claim 17, wherein the posture information comprises a first distance between a rear left side of the first mobility device and a front left side of the second mobility device, and a second distance between a rear right side of the first mobility device and a front right side of the second mobility device.

19. The first mobility device of claim 18, further comprising:
  a camera configured to obtain an image comprising a rear portion of the first mobility device and a front portion of the second mobility device,
  wherein the first controller is configured to:
    determine the first distance and the second distance through image processing on the image.

20. The first mobility device of claim 17, wherein the first controller is configured to:
  transmit steering angle information of the first mobility device to the second controller.

* * * * *